June 14, 1927.

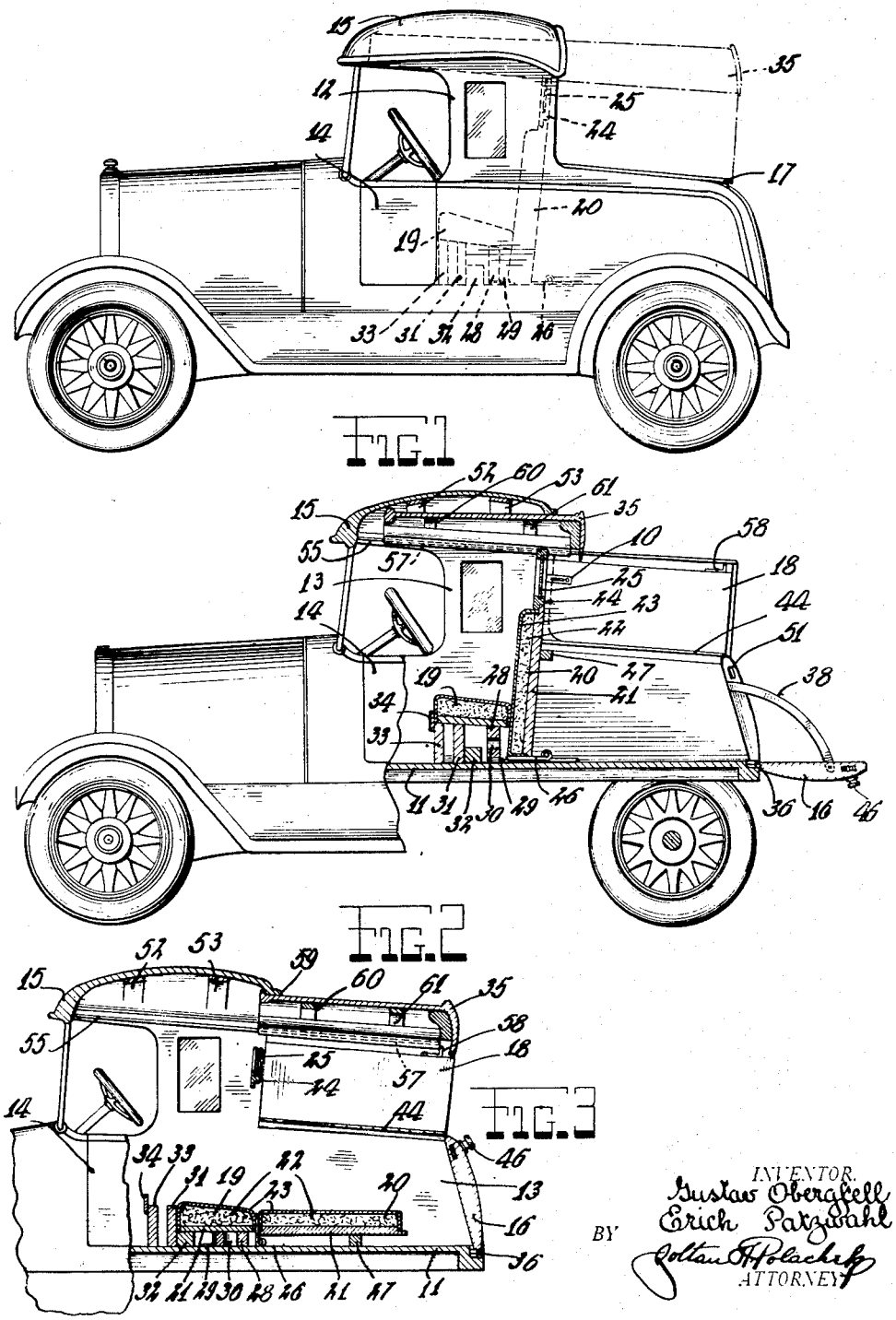

G. OBERGFELL ET AL 1,632,672

CONVERTIBLE AUTOMOBILE BODY

Filed Oct. 14, 1925   2 Sheets-Sheet 2

INVENTOR
Gustav Obergfell
Erich Patzwahl
BY
ATTORNEY

Patented June 14, 1927.

1,632,672

UNITED STATES PATENT OFFICE.

GUSTAV OBERGFELL AND ERICH PATZWAHL, OF BRONX, NEW YORK.

CONVERTIBLE AUTOMOBILE BODY.

Application filed October 14, 1925. Serial No. 62,351.

The object of this invention is to provide a new and improved convertible automobile body arranged to permit of converting it into a runabout, or a closed car, and to permit of providing sleeping accommodation in the closed car form.

With these and other objects in view, the invention consists of certain novel features of construction and arrangement of parts as hereinafter shown and described and then specifically pointed out in the claims.

A practical embodiment of the invention is represented in the accompanying drawings forming a part of this specification, in which similar characters of reference indicate similar or corresponding parts in all the views.

Fig. 1 is a side elevation of an automobile provided with a runabout body. The dash and dot lines indicate position of parts taken when the automobile is converted to a closed car form.

Fig. 2 is a side elevation, partly in longitudinal section, showing the back panel opened, and the side panel walls raised.

Fig. 3 is a fragmentary side elevation partly in longitudinal section of the vehicle body with the seat turned to a horizontal position to provide for sleeping accommodations, the back panel closed, the side panel walls raised, and the roof extended.

Figure 4:
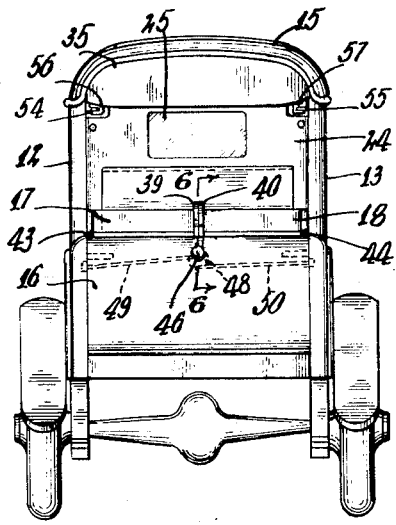
Fig. 4 is a rear elevation of Figure 1.
Figure 5:
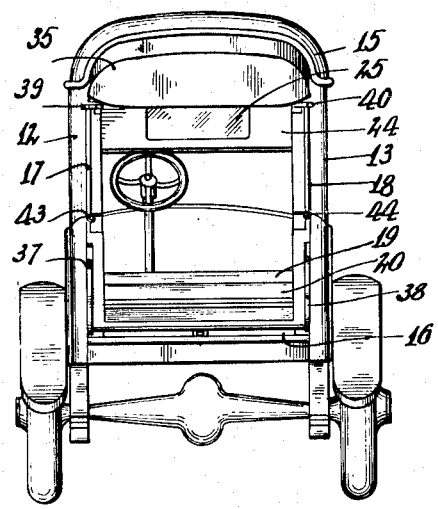
Fig. 5 is a rear elevation of Figure 3 except that the back panel is opened.
Figure 6:
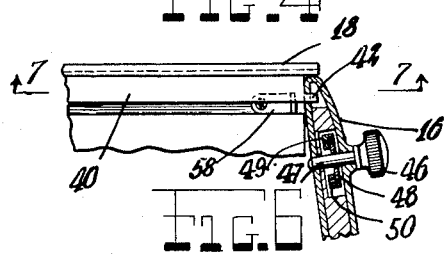
Fig. 6 is an enlarged fragmentary sectional view on the line 6—6 of Figure 4.
Figure 7:
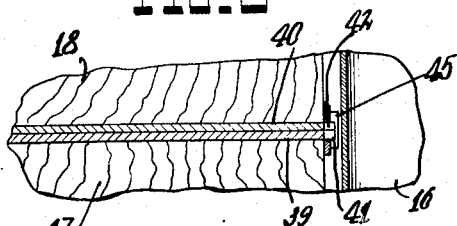
Fig. 7 is a fragmentary sectional view on the line 7—7 of Figure 6.
Figure 8:
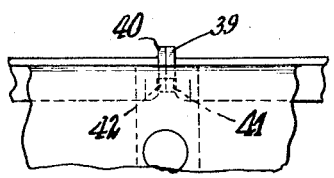
Fig. 8 is a detail view showing a fragment of the rear panel door.
Figure 9:
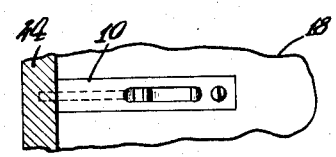
Fig. 9 is a detail showing an enlarged view of push lock 10 of Figure 2.

The main body of the automobile body comprises a floor 11, sides 12 and 13 permanently fastened to the floor 11 and provided with a side 14 mounted to swing-open and close in the usual manner, a roof 15 permanently fastened to said sides 12 and 13, a back panel door 16 and two top panel doors 17 and 18.

Within the main body is a seat 19, and a seat back 20, consisting of rigid members 21, padding material 22, and leather covers 23. A partition 24 provided with a cutout 25 for a window extends across from side 12 to side 13. Seat back 20 at its lower end is hinged to the floor 11 by hinges 26, whereby said seat back 20 may be lowered into a horizontal position, with upper end of seat back 20 supported by support 27 against the floor 11. Seat 19 may be lifted from its place, and adjustable rest 28 provided with a hinge 29 at its lower end acting in conjunction with the floor 11, may be lowered to lay on the floor. Said rest 28 is provided with a hole 30 used for convenience in gripping for lowering and raising. Seat 19 may now be placed against support 31, on block 32 and adjustable rest 28. Said seat 19 will now be in line with seat back 20, and can be used for sleeping purposes. Seat back 20 in its raised position has its upper end stopped against partition 24. Seat 19 in its normal position rests on support 31, on adjustable rest 29 in raised position, and on support 33 provided on the front side with guide strip 34.

The two top panel doors 17 and 18 may be raised to provide wall extensions for the lower rear portion of sides 12 and 13, and push locks 10 fastened on said sides and movable into holes in partition 24 are used to maintain the panel doors in these positions. A telescoping roof 35 situated under roof 15 may be drawn out to form a roof extension for the said wall extension.

Back panel door 16 is provided with hanges 36 acting in conjunction with floor 11. Two segment bars 37 and 38 of slightly more than 90° have each one of their ends connected with back panel door 16, and are slidably attached to sides 12 and 13 and a stop provided so that the attached door may be lowered to a horizontal position and no further.

Top panel doors 17 and 18 have strips 39 and 40 respectively fastened on their edges, and these strips are provided with tongues 41 and 42 respectively on their outer ends. These panel doors 17 and 18 are provided with hinges 43 and 44 acting in conjunction with sides 12 and 13, to permit raising and lowering.

Back panel door 16 has an aperture 45 into which tongues 41 and 42 project when said doors are closed, thus locking the two panel doors 17 and 18. To lock back panel door 16 a knob 46 is provided with shaft 47 carrying wheel 48, and two locking rods 49 and 50 eccentrically mounted on said wheel 48 and pivoted, so that when knob is turned locking rods enter slots 51 in sides 12 and 13.

The roof 15 has re-inforcing ribs 52 and 53 extending transversely across. Longitudinal tracks 54 and 55 are for slidable engagement with longitudinal runners 56 and 57 attached to the telescope roof 35. Said telescoping roof is constructed to be suspended underneath the roof 15, and is capable of being drawn out as far as stop 58 permits, and the joint 59 between the two roofs must then be tight. Reinforcing ribs 60 and 61 extend transversely across the telescoping roof 35.

While we have illustrated and described our invention with some degree of particularity, we realize that in practice various alterations therein may be made. We therefore reserve the right and privilege of changing the form of the details of construction or otherwise altering the arrangement of the co-related parts without departing from the spirit or the scope of the appended claims.

Having thus described our invention, what we claim as new, and desire to protect by Letters Patent of the United States is as follows:—

1. In a convertible automobile body, a driver's seat comprising a removable horizontal seat portion, a hinged seat back member disposed in a substantially vertical position adjacent the rear edge of said horizontal seat portion, a closure for said driver's seat including a telescoping top member, a rear cabinet disposed in back of said closure having the forward end provided by the rear of said seat back member, hinged panel doors comprising the top of said cabinet adapted to be rotated upwardly into a substantially vertical position in alignment with the sides of said rear cabinet to extend the heights of the sides thereof and to permit rotation of said hinged seat member into a substantially horizontal position for providing a bed, said telescoping top being adapted to be extended the entire length of said side members for covering the space therebetween.

2. In a convertible body, the combination with a closure for the driver's seat thereof, of a rear cabinet positioned in back of said driver's seat, a hinged seat back disposed between said closure and said cabinet to provide a partition therebetween when in a substantially vertical position, and hinged upper covers for said rear cabinet adapted to be rotated into substantially vertical positions to permit said seat back to be rotated into a substantially horizontal position for providing a bed.

3. In a convertible automobile body, the combination with a closure for the driver's seat thereof, of a rear cabinet positioned in back of said driver's seat, a hinged seat back disposed between said closure and said cabinet to provide a partition therebetween when in a substantially vertical position, hinged upper covers for said rear cabinet adapted to be rotated into substantially vertical positions to permit said seat back to be rotated into a substantially horizontal position for providing a bed, and a hinged rear end having locking means thereon adapted to lock said hinged upper covers and said hinged rear end at one and the same time.

4. The combination with a vehicle cab, of a telescoping top therefor, a rear cabinet disposed in back of said cab, and a top cover for said cabinet comprising hinged panel doors adapted to be rotated into substantially vertical position, said telescoping cab top being adapted to extend the entire length of said rear cabinet for covering the space between said panel doors when the latter are disposed vertically.

In testimony whereof we have affixed our signatures.

GUSTAV OBERGFELL.
ERICH PATZWAHL.